US011298607B2

(12) United States Patent
Silverberg et al.

(10) Patent No.: US 11,298,607 B2
(45) Date of Patent: Apr. 12, 2022

(54) INTERACTIVE GAME SUITABLE FOR PERSONS WITH MOBILITY ISSUES

(71) Applicant: Smiley Goat LLC, West Chester, OH (US)

(72) Inventors: Grace Silverberg, West Chester, OH (US); Mackenzie Novean, West Chester, OH (US); Elizabeth Biehle, West Chester, OH (US); Logan Fox, Liberty Township, OH (US)

(73) Assignee: SMILEY GOAT LLC, West Chester, OH (US)

( * ) Notice: Subject to any disclaimer, the term of this patent is extended or adjusted under 35 U.S.C. 154(b) by 26 days.

(21) Appl. No.: 16/914,314

(22) Filed: Jun. 27, 2020

(65) Prior Publication Data

US 2020/0406124 A1  Dec. 31, 2020

Related U.S. Application Data

(60) Provisional application No. 62/867,531, filed on Jun. 27, 2019.

(51) Int. Cl.
*A63F 3/00* (2006.01)
*A63F 13/245* (2014.01)

(52) U.S. Cl.
CPC ........ *A63F 3/00643* (2013.01); *A63F 13/245* (2014.09); *A63F 2003/00652* (2013.01)

(58) Field of Classification Search
CPC ............... A63F 3/00643; A63F 13/245; A63F 2003/00652; A63F 9/0001; A63F 2009/2407; A63F 2009/2457; A63F 2009/2402; A63F 2009/2404
See application file for complete search history.

(56) References Cited

U.S. PATENT DOCUMENTS

| | | | |
|---|---|---|---|
| 2,458,966 A | 1/1949 | Waldrop | |
| 3,680,865 A | 8/1972 | Davis | |
| 3,690,665 A * | 9/1972 | Becker | A63F 3/00643 273/237 |
| 4,228,596 A | 10/1980 | Daniel | |
| 4,779,873 A * | 10/1988 | Joergensen | A63F 3/00643 273/237 |
| 5,436,640 A | 7/1995 | Reeves | |
| 5,474,295 A | 12/1995 | Demshuk | |
| 5,810,359 A | 9/1998 | Wilkins et al. | |
| 6,102,397 A * | 8/2000 | Lee | A63F 3/00643 273/238 |
| 6,811,491 B1 | 11/2004 | Levenberg et al. | |
| 7,008,316 B1 | 3/2006 | Pugh | |
| 7,693,610 B2 | 4/2010 | Ying | |
| 9,345,954 B2 | 5/2016 | Christensen, Jr. | |

(Continued)

FOREIGN PATENT DOCUMENTS

DE  202006002391  11/2006

*Primary Examiner* — Seng H Lim
(74) *Attorney, Agent, or Firm* — Thomas E. Lees, LLC

(57) ABSTRACT

A board game in which game action is initiated by the use of easy-to-hit buttons, switches or joysticks incorporated into the game, which stimulate board interaction and motion. The board game "pieces" need not be directly manipulated and cannot move about the board unintentionally. Rather, the pieces are lights or illuminated icons which are fixed to the playing surface, and which are controlled to advance in a pattern.

17 Claims, 8 Drawing Sheets

(56) References Cited

U.S. PATENT DOCUMENTS

| | | |
|---|---|---|
| 9,630,120 B2 | 4/2017 | Stubenfoll |
| 2005/0130742 A1 | 7/2005 | Feldman et al. |
| 2006/0255539 A1 | 11/2006 | Webber |
| 2010/0113148 A1* | 5/2010 | Haltovsky ............. A63F 13/235 463/30 |
| 2013/0244784 A1* | 9/2013 | Assa .................... G06F 3/0416 463/40 |
| 2014/0159309 A1 | 6/2014 | Jiang |
| 2016/0214004 A1* | 7/2016 | Christensen, Jr. .. A63F 11/0051 |
| 2016/0243417 A1* | 8/2016 | Huffman ................. A63F 9/183 |
| 2017/0036102 A1* | 2/2017 | Huffman ............... A63F 13/235 |
| 2017/0232348 A1* | 8/2017 | Williams ............ A63F 13/5375 463/31 |
| 2019/0340869 A1 | 11/2019 | Rosander |
| 2020/0188770 A1* | 6/2020 | Strangfeld ................ A63F 9/24 |
| 2020/0238170 A1* | 7/2020 | Alsaid .................... A63F 13/87 |

\* cited by examiner

INTERACTIVE GAME SUITABLE FOR PERSONS WITH MOBILITY ISSUES

CROSS REFERENCE TO RELATED APPLICATIONS

This application claims the benefit of U.S. Provisional Patent Application Ser. No. 62/867,531, filed Jun. 27, 2019, entitled INTERACTIVE GAME SUITABLE FOR PERSONS WITH MOBILITY ISSUES, the disclosure of which is hereby incorporated by reference.

FIELD OF THE INVENTION

The present invention relates to interactive games and particularly a game suitable for all individuals, and especially for persons with mobility issues.

BACKGROUND OF THE INVENTION

There are numerous conditions that cause individuals to experience mobility issues. In this regard, an individual's mobility may be affected by an injury (which may be temporary or permanent), a disease, or a condition present since birth. For instance, individuals with spinal muscular atrophy (SMA) may exhibit mobility issues in the arms, legs, and other muscles. Other conditions, such as arthritis, cerebral palsy, muscular dystrophy, amputations, spinal cord injuries, etc., may also limit the mobility of an individual. Moreover, some conditions, which may be caused by injury, disease, or birth condition, may affect the mental capacity of an individual.

SUMMARY OF THE INVENTION

The present disclosure provides a game in which each player interacts with the game in a consistent manner. Game action is initiated by the use of easy-to-hit buttons, switches or joysticks incorporated into the game, which stimulate board interaction and motion. The board interaction is suitable for persons with mobility issues. As such, not only can persons with mobility issues play the game, any stigma associated with a perceived handicap is removed because every individual player interacts with the game in the same way.

In some embodiments, the board game "pieces" need not be directly manipulated. Rather, a controller translates the player's interaction in to a board experience. In some embodiments, a player cannot move about the board unintentionally, thus teaching and/or reinforcing rule-based play. Rather, they illuminable lights or icons are fixed to the playing surface.

According to aspects herein, a board game is provided, in which game action is initiated by players using buttons, switches or joysticks incorporated into the game. The game comprises a game board, and a controller. The controller comprises one or more of buttons, switches or joysticks for use by a player to interact with the game board to participate in a game. The game board incorporates a light control interface and a plurality of illuminable lights or icons to identify the position of the player on the game board, without requiring direct manipulation thereof.

According to further aspects of the present disclosure, a game system is provided. The game system comprises a game board having a first string of illuminable indicia and a second string of illuminable indicia thereon. Here, each of the first string of illuminable indicia and the second string of illuminable indicia having individual light elements. The game system also includes a first controller comprising at least one controller input for use by a first player to interact with the game board to participate in a game by controlling the first string of illuminable indicia. Analogously, the game system comprises a second controller comprising at least one controller input for use by a second player to interact with the game board to participate in the game by controlling the second string of illuminable indicia. The game system further comprises a virtualized turn generator having an input and an output display, wherein actuation of the input causes the virtualized turn generator to generate a value, where the value on the output display can be designated by the first controller and the second controller. Also, the game system comprises a processor programmed by program code stored in memory to interact with the first controller to selectively turn on or off the individual light elements of the first string of illuminable indicia and interact with the second controller to selectively turn on or off the individual light elements of the second string of illuminable indicia.

According to yet further aspects of the present disclosure, a game system is provided. The game system comprises a game board having a string of illuminable indicia having individual light elements. The game system also comprises a first controller comprising at least one controller input for use by a first player to interact with the game board to participate in a game by controlling a first characteristic of the string of illuminable indicia. Analogously, the game system comprises a second controller comprising at least one controller input for use by a second player to interact with the game board to participate in the game by controlling the a second characteristic of the string of illuminable indicia. The game system also comprises a virtualized turn generator having an input and an output display, wherein actuation of the input causes the virtualized turn generator to generate a value, where the value on the output display can be designated by the first controller and the second controller. Still further, the game system comprises a processor programmed by program code stored in memory to interact with the first controller to selectively control the first characteristic of the individual light elements of the string of illuminable indicia and interact with the second controller to selectively control the second characteristic of the individual light elements of the string of illuminable indicia.

DETAILED DESCRIPTION

Aspects herein provide an illuminated, user controlled, game board system that visually depicts on a game board, a start location, a path, and an end location via at least one string of light elements. An input, e.g., in the form of a button control, enables players to take a turn by generating a value, e.g., simulating a number rolled by a dice. The player then engages an associated controller, e.g., presses a button, combination of buttons, etc., corresponding to the value "rolled" to advance their light along the path. The goal is to reach the end location before the other player does so. The game system allows individuals, including those with limited mobility, the ability to engage in an activity that can be enjoyable, rehabilitating, educational, or a combination thereof. Notably, the use of large buttons, and electronically controlled light elements remove the requirement to manually pick up, and precisely move small game pieces on a conventional game board, which may be difficult for some individuals. Moreover, those individuals without mobility issues interact with the game board using the same controls, thus making the experience the same for all users.

Figure 1:
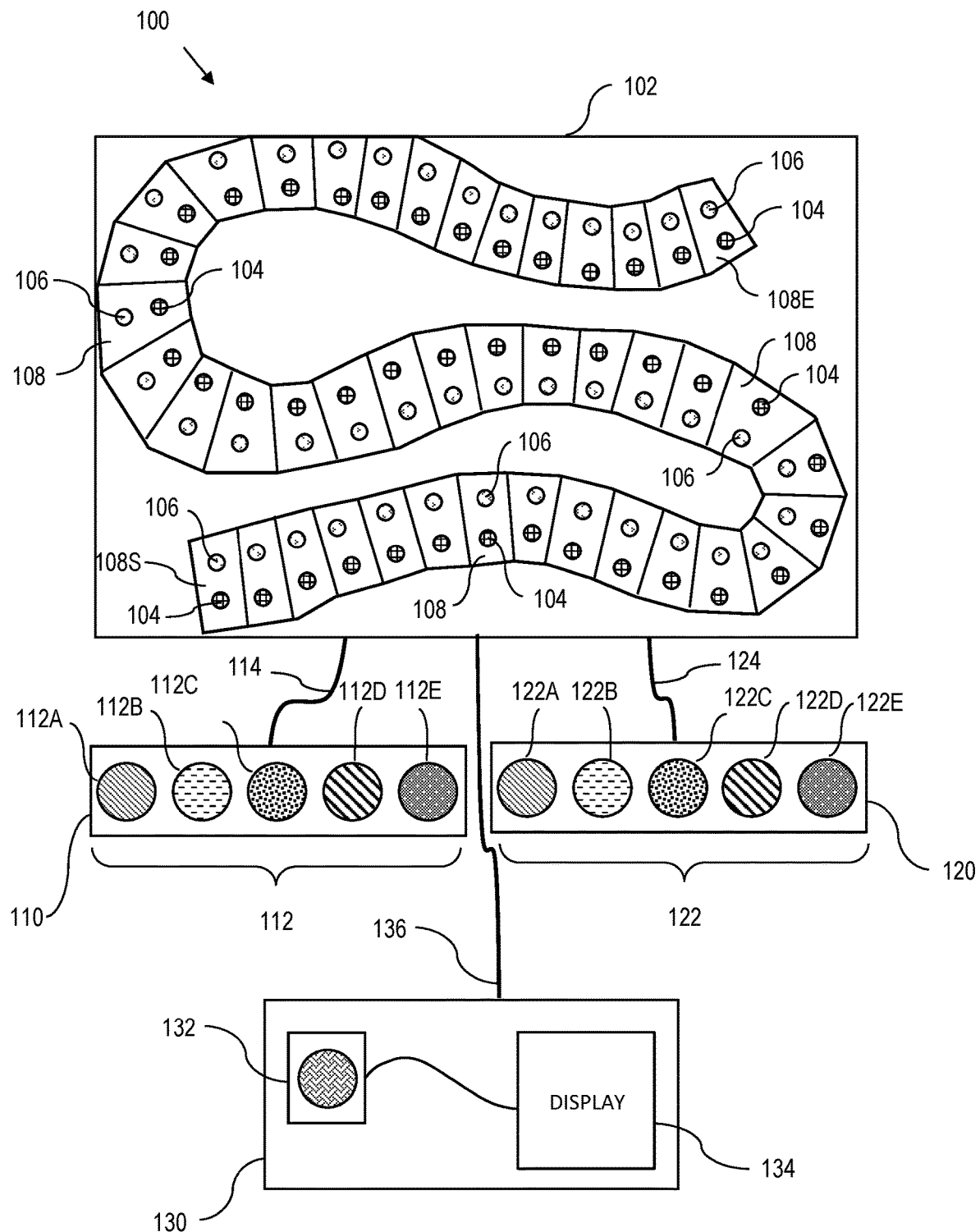
FIG. 1 illustrates an example game system including a game board, controller set, and virtualized turn generator.

Referring now to the drawings, and in particular to FIG. 1, an example game system 100 is illustrated, according to aspects of the present disclosure. The game system 100 includes in general, a game board 102 having a first string of illuminable indicia 104 and a second string of illuminable indicia 106 thereon. For convenience of illustration, the first string of illuminable indicia 104 is illustrated in a first cross hatch, whereas the second string of illuminable indicia 106 is illustrated in a second cross hatch different from the first cross hatch. In an example embodiment, when illuminated, an individual light element in the first string of illuminable indicia 104 will illuminate in a set color, e.g., blue. Thus, each individual light element in the first string of illuminable indicia 104 will illuminate blue when powered on. Analogously, when illuminated, an individual light element in the second string of illuminable indicia 106 will illuminate in a set color, e.g., red. Thus, each individual light element in the second string of illuminable indicia 106 will illuminate red when powered on. In some embodiments, the select color may be programmable. In other embodiments, such as for those individuals with visual impairments such as color blindness, individual light elements of the first string of illuminable indicia 104 may flash, blink or pulse a pattern different from individual light elements of the second string of illuminable indicia 106.

The game board 102 also includes a set of landing spaces 108. In FIG. 1, individual landing spaces are designated by a quadrilateral bounded region, and not every landing space is labeled for clarity and conciseness of the FIGURE. In other embodiments, each landing space can take on other shapes, sizes, patterns, etc. In the non-limiting example, the landing spaces 108 collectively form a serpentine pattern, although any other patterns/shapes/layouts, etc. may be implemented.

As illustrated, the first string of illuminable indicia 104 and the second string of illuminable indicia 106 include the same number of light elements. Moreover, there is a single light element from the first string of illuminable indicia 104 and a single light element from the second string of illuminable indicia 106 positioned within each landing space 108.

As illustrated, the landing spaces 108 include a "start" landing space, designated 108S. When a game is initially commenced, the light element from the first string of illuminable indicia 104 and the light element from the second string of illuminable indicia 106 positioned within the start landing space 108S will be illuminated, designating that each player is at the start.

The landing spaces 108 also include an "end" landing space, designated 108E. Navigating the game board 102 such that the light element from the first string of illuminable indicia 104 or the light element from the second string of illuminable indicia 106 positioned within the end landing space 108E illuminates, designates the associated winner of the game.

Thus, on the illustrated game board 102, there are a series of intermediate landing spaces 108 forming a path that defines movement between the start landing space 108S and the end landing space 108E.

In an example embodiment, a single light element in the first string of illuminable indicia 104, and a single light element in the second string of illuminable indicia 106, are illuminated any given time. Moreover, the select illuminated element traverses forward and/or backward along the first string of illuminable indicia 104, thus simulating movement of a game piece associated as a first player. Analogously, the select illuminated element traverses forward and/or backward along the second string of illuminable indicia 106, thus simulating movement of a game piece associated as a second player.

In other words, a first player's position on the game board 102 is associated with one of the landing spaces 108, and is thus designated by illuminating the individual light element of the first string of illuminable indicia 104 on that associated landing space 108, and by turning off all other individual light elements of the first string of illuminable indicia 104. Analogously, a second player's position on the game board 102 is associated with one of the landing spaces 108, and is thus designated by illuminating the individual light element of the second string of illuminable indicia 106 on that associated landing space 108, and by turning off all other individual light elements of the second string of illuminable indicia 106.

Although shown as two strings of illuminable indicia per landing space 108, in practice, there can be one string of illuminable indicia, e.g., where there is one color changing light element per landing space 108. In other embodiments, there can be more than two light elements per landing space 108. For instance, in a four-player version, there may be four light elements, each light element associated with a unique string of illuminable indicia, etc. Thus, the number of light elements per landing space, and corresponding strings of illuminable indicia can vary, depending upon the number of players the game board 102 can accommodate.

As illustrated, the first string of illuminable indicia 104 and the second string of illuminable indicia 106 each have individual light elements. The light elements may comprise an incandescent light, a light emitting diode (LED), or other form of illumination. In this regard, the first string of illuminable indicia 104 and the second string of illuminable indicia 106 may comprise a string of lights, a string of LEDs, a single LED and a fiber optic cable network, reflectors, or other combination. In a working example, the individual light elements of the first string of illuminable indicia 104 are a first color, e.g., blue. Correspondingly, the individual light elements of the second string of illuminable indicia 106 are a second color different from the first color, e.g., red.

The functionality of the first string of illuminable indicia 104 and the second string of illuminable indicia 106 are described in greater detail herein.

The game system also includes a first controller 110, which comprises at least one controller input 112 for use by a first player to interact with the game board 102 to participate in a game by controlling the first string of illuminable indicia 104. Solely for sake of illustration, the first controller 110 includes five controller inputs, including a first controller input 112A, a second controller input 112B, a third controller input 112C, a fourth controller input 112D, and a fifth controller input 112E. Each controller input 112 can be the same or different, e.g., all buttons, all switches, a combination of buttons, switches, joysticks, etc. Each controller input 112 may illuminate when actuated to provide positive feedback to the user that the controller input 112 has been actuated. The first controller 110 can also incorporate tactile feedback (e.g., via vibration), sound feedback (e.g., via a speaker), etc. As illustrated, the first controller 110 is communicably coupled to the game board 102 via wired connection 114. In alternative embodiments, the first controller 110 can be communicably coupled to the game board 102 via a wireless connection, e.g., Bluetooth, ultra-wide band, Wi-Fi, etc. Here, the first controller 110 can be battery powered for convenience.

In an example implementation, the first string of illuminable indicia 104 is blue, and thus the first controller 110 can be implemented in a blue housing so that a player can readily associate the first controller 110 with player 1 and the first string of illuminable indicia 104. Moreover, in an example implementation, the first controller input 112A is designated "1" and when pressed, advances the illuminated light element by one light element in the first string of illuminable indicia 104. The second controller input 112B is designated "2" and when pressed, advances the illuminated light element by two light elements in the first string of illuminable indicia 104. The third controller input 112C is designated "3" and when pressed, advances the illuminated light element by three light elements in the first string of illuminable indicia 104. The fourth controller input 112D is designated "4" and when pressed, advances the illuminated light elements by four elements in the first string of illuminable indicia 104. The fifth controller input 112E is designated "special" and can implement "special" functions, such as "jump", "extra turn", "lose a turn", or other function, examples of which are set out in greater detail herein. In practice, the various control inputs can move the illuminated light element in other manners, e.g., forward, backward, in any desired/programmed manner.

In some example embodiments, a more buttons can be utilized, and in other embodiments, less buttons can be utilized. Also, in some embodiments, the illuminated light element may be advanced (or retreated) by pressing a single button multiple times. For example, the illuminated light element may be advanced three spaces by pressing the first controller input 112A three successive times, etc.

The illustrated game system also includes a second controller 120, which comprises at least one controller input 122 for use by a second player to interact with the game board 102 to participate in a game by controlling the second string of illuminable indicia 106. Solely for sake of illustration, the second controller 120 includes five controller inputs, including a first controller input 122A, a second controller input 122B, a third controller input 122C, a fourth controller input 122D, and a fifth controller input 122E. Each controller input 122 can be the same or different, e.g., all buttons, all switches, a combination of buttons, switches, joysticks, etc. Each controller input 122 may illuminate when actuated to provide positive feedback to the user that the controller input 122 has been actuated. The second controller 120 can also incorporate tactile feedback (e.g., via vibration), sound feedback (e.g., via a speaker), etc. As illustrated, the second controller 120 is communicably coupled to the game board 102 via wired connection 124. In alternative embodiments, the second controller 120 can be communicably coupled to the game board 102 via a wireless connection, e.g., Bluetooth, ultra-wide band, Wi-Fi, etc. Here, the second controller 120 can be battery powered for convenience.

In an example implementation, the second string of illuminable indicia 106 is red, and thus the second controller 120 can be implemented in a red housing so that a player can readily associate the second controller 120 with player 2 and the second string of illuminable indicia 106. Analogous to that described above, in an example implementation, the first controller input 122A is designated "1" and when pressed, advances the illuminated light element by one light element in the second string of illuminable indicia 106. The second controller input 122B is designated "2" and when pressed, advances the illuminated light element by two light elements in the second string of illuminable indicia 106. The third controller input 122C is designated "3" and when pressed, advances the illuminated light element by three light elements in the second string of illuminable indicia 106. The fourth controller input 112D is designated "4" and when pressed, advances the illuminated light elements by four elements in the second string of illuminable indicia 106. The fifth controller input 122E is designated "special" and can implement "special" functions, such as "jump", "extra turn", "lose a turn", or other function, examples of which are set out in greater detail herein. In practice, the various control inputs can move the illuminated light element in other manners, e.g., forward, backward, in any desired/programmed manner.

In some example embodiments, a more buttons can be utilized, and in other embodiments, less buttons can be utilized. Also, in some embodiments, the illuminated light element may be advanced (or retreated) by pressing a single button multiple times. For example, the illuminated light element may be advanced three spaces by pressing the first controller input 122A three successive times, etc.

The first controller 110 and the second controller 120 can be implemented in various form factors, such as hand-held controllers, mat that can be stepped on, e.g., etc., depending upon the target user. Moreover, the controller inputs can include labels, colors, or other characteristics that enable a user to associate the controller input with an associated characteristic, e.g., move, jump, lose a turn, gain a turn, etc. As a further example, each of the first controller 110 and the second controller 120 can include a "scribble strip", erasable strip, whiteboard strip, etc., that allows an individual, e.g., a teacher, therapist, rehabilitation specialist, to label each control input so that each control input can be dynamically assigned a label that is context sensitive to the player. For instance, a scribble strip can be implemented as a strip along the front face under each control input, as a strip on a side of the controller housing so as to align with each control input, etc., as is necessary to covey information to the user.

A virtualized turn generator 130 includes an input 132 and an output display 134. The virtualized turn generator 130 is illustrated connected to the game board via a wired connection 136. In alternative embodiments, the virtualized turn generator 130 can be communicably coupled to the game board 102 via a wireless connection, e.g., Bluetooth, ultra-wide band, Wi-Fi, etc. Here, the virtualized turn generator 130 can be battery powered for convenience. Moreover, as illustrated, the input 132 and the output display 134 are co-located. However, in practice, the input 132 and output display 134 need not be co-located. For instance, the output display 134 can be integrated into the game board 102, etc.

In use, actuation of the input 132 causes the virtualized turn generator to generate a value within a range of a predefined minimum value and a predefined maximum value. These values can be fixed or programmable, depending upon how the game is implemented. For instance, as a practical example, the minimum value may be zero (0), one (1), etc. Likewise, the maximum value may be three (3), four (4), or any reasonable number, e.g., a number within the range of the display. For instance, if the output display 134 is a single-digit, seven segment display, the minimum value may be zero or one, and the maximum value may be nine or less.

As another example, the virtualized turn generator may simulate rolling a dice. Here, the virtualized turn generator 130 may be programmed to virtually roll any number-sided dice, e.g., a four-sided dice, six-sided dice, eight-sided dice, twenty-sided dice, etc. Yet further, the virtualized turn generator 130 can roll multiple dice, which can have the same number of virtual sides, or a different number of virtual sides. In other examples, the virtualized turn generator 130 can draw a card, pick a color, spin a virtual wheel, etc. In this regard, the output display 134 may comprise a seven-segment display, a multi-digit seven-segment display, an LCD display screen, a touch screen, or any suitable display. In some embodiments, the output display 134 visually displays the generated value. In other embodiments, the output display 134 visually displays additional information, such as the player whose turn it is, any programmed rules for the game, instructions, comments, etc.

In yet another example, the individual light elements of the first string of illuminable indicia 104 are a first color, e.g., blue, and the individual light elements of the second string of illuminable indicia 106 are a second color, e.g., red. In this arrangement, the output display can include color, e.g., an RGB seven-segment LED display. Here, when the game calls for player 1 to take a turn, the RGB seven-segment LED display can turn to the color of the first player (e.g., blue in this example). Correspondingly, when the game calls for player 2 to take a turn, the RGB seven-segment LED display can turn to the second color, e.g., red in the illustrative example. Such an arrangement can provide practice to players with matching colors.

Regardless of how the virtualized turn generator is implemented, the value on the output display 134 of the virtualized turn generator 130 should be able to be designated by the first controller 110 and the second controller 120.

For instance, in the illustrated example, assume that the virtualized turn generator 130 randomly generates a number between one and four (1-4). In this regard, as described more fully above, the first controller 110 includes a first controller input 112A corresponding to a value of one (1), a second controller input 112B corresponding to a value of two (2), a third controller input 112C corresponding to a value of three (3), and a fourth controller input 112D corresponding to a value of four (4). As illustrated the first controller 110 can also include a fifth controller input 112E, which can correspond to some other function, e.g., a random jump, a redo of a turn, or any other desired functionality. Analogously, the second controller 120 includes a first controller input 122A corresponding to a value of one (1), a second controller input 122B corresponding to a value of two (2), a third controller input 122C corresponding to a value of three (3), and a fourth controller input 122D corresponding to a value of four (4). As illustrated the second controller 120 can also include a fifth controller input 122E, which can correspond to some other function, e.g., a random jump, a redo of a turn, or any other desired functionality.

The game system also includes a processor programmed by program code stored in memory to interact with the first controller 110 to selectively turn on or off the individual light elements of the first string of illuminable indicia 104 and interact with the second controller 120 to selectively turn on or off the individual light elements of the second string of illuminable indicia 106, as will be described in greater detail herein.

Example Control Architecture

Figure 2:
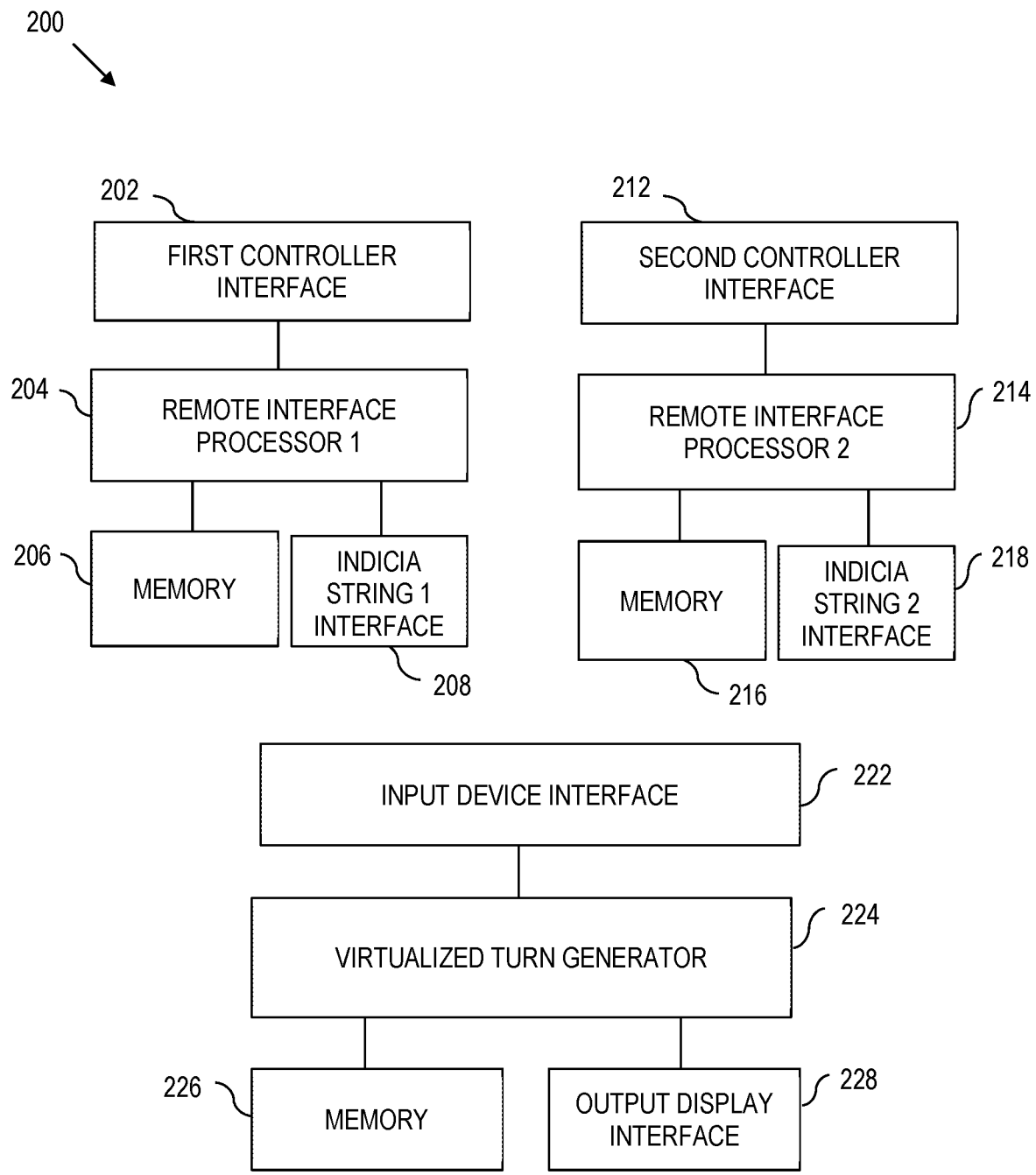
FIG. 2 illustrates an example control architecture for the game system of FIG. 1.

Referring to FIG. 2, in an example control architecture 200 of the game system 100 is illustrated according to certain aspects of the present disclosure. The control architecture 200 comprises a first controller interface 202. The first controller interface 202 can implement the hardware necessary to couple the controller inputs 112 on the first controller 112 (FIG. 1) to a processor. As such, the first controller interface 202 can include electronics to interface all of the features and capabilities discussed with regard to the first controller 112. For instance, in a working example, the first controller interface 202 includes hardware necessary to electrically couple the five controller inputs 112A-112E (FIG. 1) that can be pressed to implement various game function.

The first controller interface 202 is electrically coupled to a first remote interface processor 204. The first remote interface processor 204 is coupled to memory 206, and to a first illuminable indicia interface 208. Here, the first illuminable indicia interface 208 can include for example, a bus, electrical wires, circuit board, drivers, address decoding logic, other components, and combinations thereof, necessary to control the first string of illuminable indicia 104 described with reference to FIG. 1. In practical applications, the memory 206 can be integrated into the first remote interface processor 204, such as where the first remote interface processor 204 is implemented as a microcontroller. In an example embodiment, the first string of illuminable indicia 104 (FIG. 1) comprises a WS2811 pixel digital addressable LED light string. The light string uses addressable LEDS, such as RGB or RGB+W LEDs such that a single signal line is needed from the controller (e.g., remote interface processor 204) to be able to control power to, and optionally the color of, individual light elements of the first string of illuminable indicia 104.

In addition to storing code to control the game, the memory 206 can store additional data, such as the state of a game. As such, if the game is utilized as therapy, during school, or in time-limited applications, the game can be pulled out and resumed exactly where the game left off. The memory 206 can be used to store additional information as needed, e.g., color selection, number of players, etc.

With brief reference to FIG. 1 and FIG. 2, the first remote interface processor 204 controls the players movement along the game board 102 by reading the player actuations of the controller inputs 112 (e.g., buttons) on the first controller 110 as decoded by the first interface controller 202, and controlling the first string of illuminable indicia 104 via the first illuminable indicia interface 208.

Referring back to FIG. 2, in an analogous manner, the control architecture 200 comprises a second controller interface 212. The second controller interface 212 can implement the hardware necessary to couple the controller inputs 122 on the second controller 120 (FIG. 1) to a processor. As such, the second controller interface 212 can include electronics to interface all of the features and capabilities discussed with regard to the second controller 120 (FIG. 1). For instance, in a working example, the second controller interface 212 includes hardware necessary to electrically couple the five controller inputs 122A-122E (FIG. 1) that can be pressed to implement various game function.

Analogous to that above, in an example embodiment, the second string of illuminable indicia 106 (FIG. 1) comprises a WS2811 pixel digital addressable LED light string. The light string uses addressable LEDS, such as RGB or RGB+W LEDs such that a single signal line is needed from the controller (e.g., remote interface processor 214) to be able to control power to, and optionally the color of, individual light elements of the second string of illuminable indicia 106.

The second controller interface 212 is electrically coupled to a second remote interface processor 214. The second remote interface processor 214 is coupled to memory 216, and to a second illuminable indicia interface 218. Here, the second illuminable indicia interface 218 can include for example, a bus, electrical wires, circuit board, drivers, address decoding logic, other components, and combinations thereof, necessary to control the second string of illuminable indicia 106 described with reference to FIG. 1. In practical applications, the memory 216 can be integrated into the second remote interface processor 214, such as where the second remote interface processor 214 is implemented as a microcontroller.

With brief reference to FIG. 1 and FIG. 2, the second remote interface processor 214 controls the players movement along the game board 102 by reading the player actuations of the controller inputs (e.g., buttons) on the second controller 120 as decoded by the second interface controller 212, and controlling the second string of illuminable indicia 106 via the second illuminable indicia interface 212.

Referring back to FIG. 2, a virtualized turn generator control system is implemented as an input device interface 222 that couples to a virtualized turn generator processor 224. The virtualized turn generator processor 224 is coupled to memory 226 and an output display interface 228. The input device interface 222 includes the necessary hardware and electronics to couple to the input of the virtualized turn generator (e.g., the input 132 of the virtualized turn generator 130—FIG. 1). The virtualized turn generator processor 224 executes program code stored in the memory 226 to randomly generate an output in response to actuation of the input 132. Keeping with the examples of FIG. 1, the virtualized turn generator processor 224 may execute code to generate a pseudo-random number between 1-4, simulate a dice roll, simulate a card draw, wheel spin, color selection, etc., as described more fully herein. The output interface 228 includes the hardware, e.g., display driver, to couple to and control an output display (e.g., the output display 134—FIG. 1) responsive to output by the virtualized turn generator processor 224.

Referring to FIG. 1 and FIG. 2 generally, the embodiment of FIG. 2 essentially creates separate processors and control for each of the first string of illuminable indicia 104, the second string of illuminable indicia 106, and the virtualized turn generator 130. This configuration allows players with significant mobility issues to play the game because if a player presses the wrong button, or goes out of turn, the rule breakage is simply allowed, and the game plays on. This variation reinforces accessibility and engagement without the frustration of being constrained to follow a set of rules.

In some embodiments, the virtualized turn generator processor 224 can be the "master", executing rules that control a game, such as by presenting instructions via the output display interface 228 to an output display (e.g., 134, FIG. 1), to indicate which player is to take a turn, to provide rules, instructions, assistance, etc.

Also, in this embodiment, the input to the virtualized turn generator comprises a dedicated hardware input separate from the first controller and the second controller. This allows central location of the virtualized turn generator, e.g., to encourage practicing motor skills by reaching for and pressing a separate button.

Second Example Control Architecture

Figure 3:
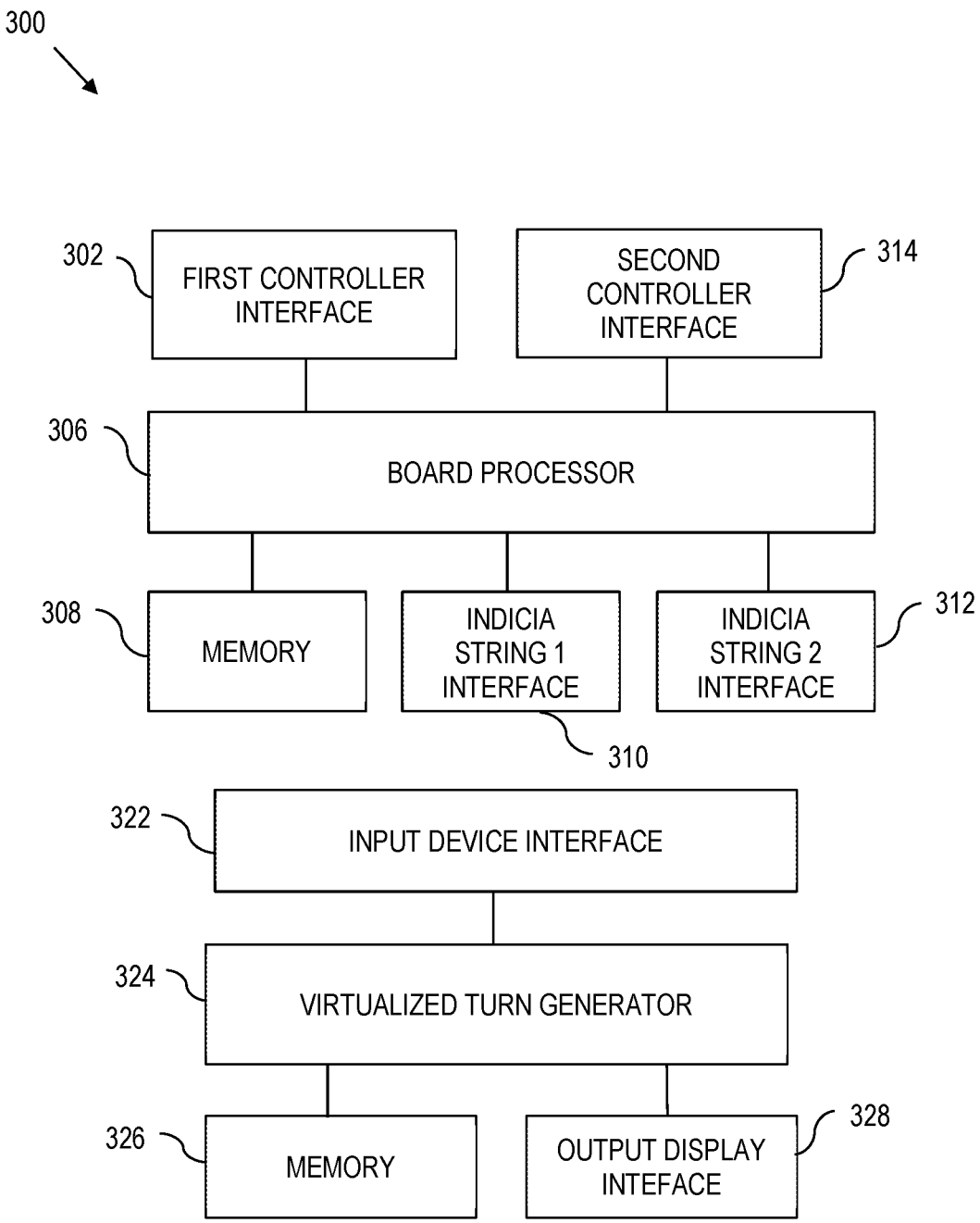
FIG. 3 illustrates another example control architecture for the game system of FIG. 1.

Referring to FIG. 3, in an alternative configuration, the game board of FIG. 1 can integrate with alternative control electronics via control architecture 300. Whereas the control architecture 200 of FIG. 2 provides each of the first controller and second controller on a completely independent control interface/processor architecture, the control architecture of FIG. 3 combines all controllers into a single processor.

As illustrated the control architecture 300 includes a first controller interface 302, a second control interface 304, and a common processor 306. The first controller interface 302 is analogous to the first controller interface 202 of FIG. 2, and a second controller interface 304 is analogous to the second controller interface 212 of FIG. 2, except that both are communicably coupled to a common board processor 306.

The first controller interface 302 can thus implement the hardware necessary to couple the controls on the first controller 110 (FIG. 1) to the common processor 306. As such, the first controller interface 302 can include electronics to interface all of the features and capabilities discussed with regard to the first controller 110 to the processor 306. For instance, in a working example, the first controller interface 302 includes hardware necessary to electrically couple the five controller inputs 112A-112E of the first controller 110 (FIG. 1) that can be pressed to implement various game function to the processor 306.

Analogously, the second controller interface 304 can implement the hardware necessary to couple the controls on the second controller 120 (FIG. 1) to a processor. As such, the second controller interface 304 can include electronics to interface all of the features and capabilities discussed with regard to the second controller 120 (FIG. 1). For instance, in a working example, the second controller interface 304 includes hardware necessary to electrically couple the five controller inputs 122A-122E of the second controller 120 (FIG. 1) that can be pressed to implement various game function to the processor 306.

The board processor 306 is coupled to memory 308, to a first illuminable indicia interface 310, and to a second illuminable indicia interface 312. The board processor 306, by virtue of electrical coupling to both the first controller interface 302 and the second controller interface 304, can implement turn rules, e.g., by not allowing a player to advance a game piece (e.g., press a button on the controller to move a light) unless it is that player's turn. Thus, in this embodiment, the processor 306 can be programmed to designate which of the first controller and the second controller can be operated to cause actuation of the input to the virtualized turn generator. For instance, in an example embodiment, the processor is programmed to toggle control between the first controller and the second controller such that a first player using the first a controller and a second player using the second controller must play in turn. Optionally, the processor can be further programmed to only accept as an input, actuation of the control element on the first controller that corresponds to the value generated by the virtualized turn generator when the processor has toggled control to the first controller, and the processor is further programmed to only accept as an input, actuation of the control element on the second controller that corresponds to the value generated by the virtualized turn generator when the processor has toggled control to the second controller.

The first illuminable indicia interface 310 is analogous to the first illuminable indicia interface 208 (FIG. 2) and can thus include for example, a bus, electrical wires, circuit board, drivers, address decoding logic, other components, and combinations thereof, necessary to control the first string of illuminable indicia 104 described with reference to FIG. 1. Analogously the second illuminable indicia interface 312 is analogous to the second illuminable indicia interface 312 (FIG. 2) and can thus include for example, a bus, electrical wires, circuit board, drivers, address decoding logic, other components, and combinations thereof, necessary to control the second string of illuminable indicia 106 described with reference to FIG. 1.

A virtualized turn generator control system is implemented as an input device interface 322 that couples to a virtualized turn generator processor 324. The virtualized turn generator processor 324 is coupled to memory 326 and an output display interface 328. The input device interface 322 includes the necessary hardware and electronics to couple the input of the virtualized turn generator (e.g., the input 132 of the virtualized turn generator 130—FIG. 1). The virtualized turn generator processor 324 executes program code stored in the memory 326 to randomly generate an output in response to an input. Keeping with the examples of FIG. 1, the virtualized turn generator processor 324 may execute code to generate a pseudo-random number between 1-4, simulate a dice roll, simulate a card draw, wheel spin, color selection, etc., as described more fully herein. The output display interface 328 includes the hardware, e.g., display driver, to couple an output display (e.g., the output display 134—FIG. 1) to the virtualized turn generator processor 324. In this regard, the hardware for the virtualized turn generator is analogous to that described with reference to FIG. 2.

Third Example Control Architecture

Figure 4:
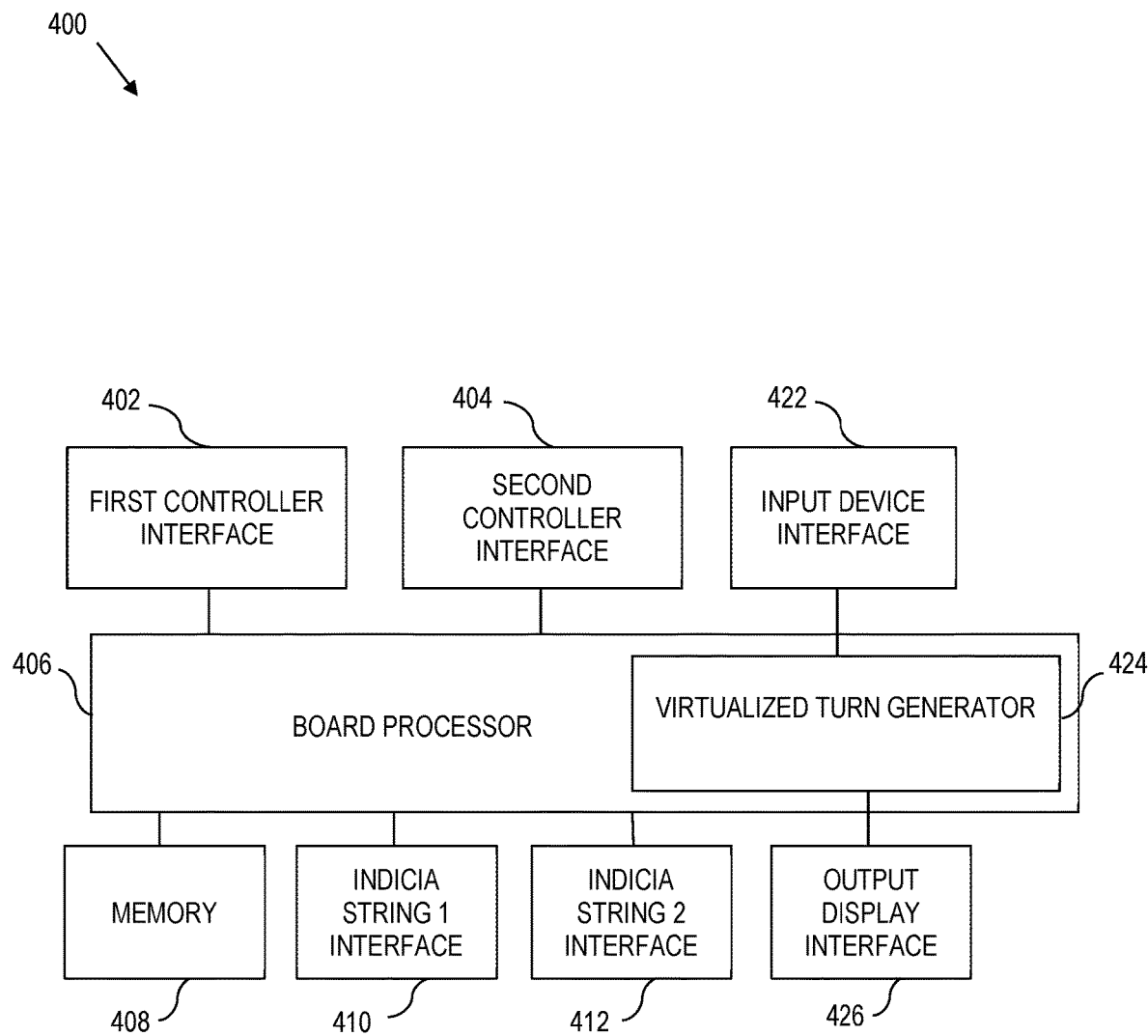
FIG. 4 illustrates yet another example control architecture where the virtualized turn generator is integrated into the game board, controllers, or a combination thereof.

Referring to FIG. 4, in yet another alternative configuration, the game board of FIG. 1 can integrate with alternative control electronics via control architecture 400. Whereas the control architecture 200 of FIG. 2 provides each controller on a completely independent processor, and the control architecture of FIG. 3 combines both controllers into a single processor but separates the virtualized turn generator, the third example architecture combines controllers and the virtualized turn generator into a single processor.

As illustrated the control architecture 400 includes a first controller interface 402, e.g., analogous to the first controller interface 202 of FIG. 2 and/or the first controller interface 302 of FIG. 3. The control architecture 400 also includes a second controller interface 404, e.g., analogous to the second controller interface 212 of FIG. 2 and/or the second controller interface 312 of FIG. 3, which are both communicably coupled to a common board processor 406.

The first controller interface 402 can thus implement the hardware necessary to couple the controls on the first controller 110 (FIG. 1) to a processor. As such, the first controller interface 402 can include electronics to interface all of the features and capabilities discussed with regard to the first controller 110 (FIG. 1). For instance, in a working example, the first controller interface 402 includes hardware necessary to electrically couple the five controller inputs 112A-112E of the first controller 110 (FIG. 1) that can be pressed to implement various game function.

Analogously, the second controller interface 404 can implement the hardware necessary to couple the controls on the second controller 120 (FIG. 1) to a processor. As such, the second controller interface 404 can include electronics to interface all of the features and capabilities discussed with regard to the second controller 120 (FIG. 1). For instance, in a working example, the second controller interface 404 includes hardware necessary to electrically couple the five controller inputs 122A-122E of the second controller 120 (FIG. 1) that can be pressed to implement various game function.

The board processor 406 is coupled to memory 408, to a first illuminable indicia interface 410, and to a second illuminable indicia interface 412. The board processor 406, by virtue of electrical coupling to both the first controller interface 402 and the second controller interface 404, can implement turn rules, e.g., by not allowing a player to advance a game piece (e.g., press a button on the controller to move a light) unless it is that player's turn and the player has pressed the input of the virtualized turn generator.

The first illuminable indicia interface 410 is analogous to the first illuminable indicia interface 208 (FIG. 2) and/or the first illuminable indicia interface 310 (FIG. 3), and can thus include for example, a bus, electrical wires, circuit board, drivers, address decoding logic, other components, and combinations thereof, necessary to control the first string of illuminable indicia 104 described with reference to FIG. 1.

Analogously the second illuminable indicia interface 412 is analogous to the second illuminable indicia interface 218 (FIG. 2) and/or the second illuminable indicia interface 312 (FIG. 3), and can thus include for example, a bus, electrical wires, circuit board, drivers, address decoding logic, other components, and combinations thereof, necessary to control the second string of illuminable indicia 106 described with reference to FIG. 1.

A virtualized turn generator control system is implemented as an input device interface 422 that couples to the board processor 406. Here, the board processor 406 executes a virtualized turn generator algorithm 424 to generate a virtual turn. The virtualized turn generator processor algorithm 424 can be stored in the memory 408, for example. The virtualized turn generator algorithm generates an output that is coupled to an output display interface 428.

The input device interface 422 includes the necessary hardware and electronics to couple to an input of the virtualized turn generator (e.g., the input 132 of the virtualized turn generator 130—FIG. 1). The virtualized turn generator algorithm 424 is executed as program code stored in the memory 408 by the board processor 406 to randomly generate an output in response to an input. Keeping with the examples of FIG. 1, the virtualized turn generator algorithm 424 may generate a pseudo-random number between a preset minimum value and a preset maximum value (e.g., between 1-3, between 1-4, etc.), simulate a dice roll, simulate the roll of multiple dice, simulate a card draw, wheel spin, picture match, color selection etc., as described more fully herein.

The output display interface 428 includes the hardware, e.g., display driver, to couple an output display (e.g., the output display 134—FIG. 1) to the virtualized turn generator processor 424. In this regard, the hardware for the output display interface 428 is analogous to the output display interface 228 (FIG. 2) and/or the output display interface 328 (FIG. 3).

Second Example Game System

Figure 5:
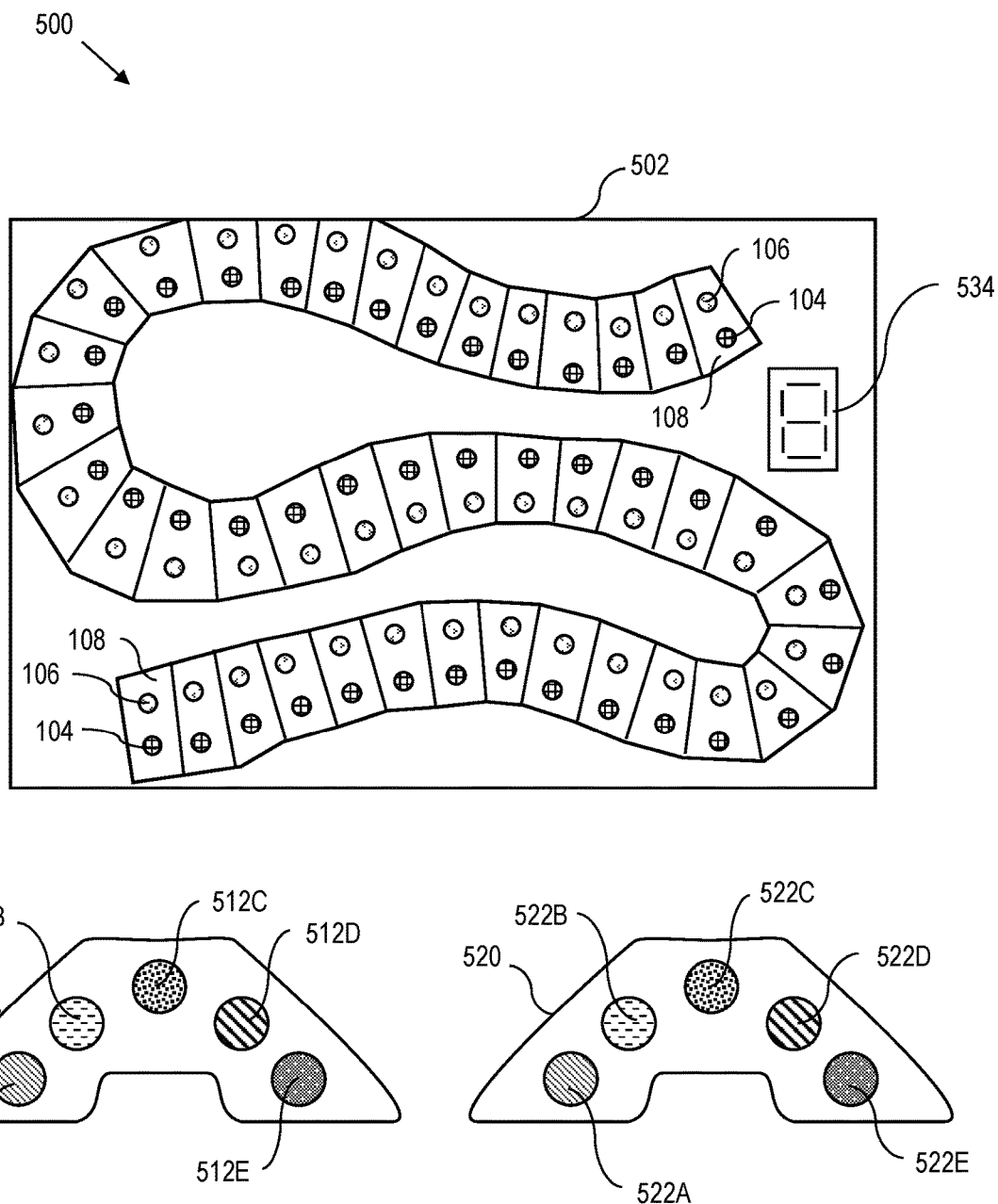
FIG. 5 illustrates another example game system, including a game board, wireless controller set and virtualized turn generator integrated into the game board and wireless controller set.

Referring to FIG. 5, a game system 500 is illustrated, which is analogous to the game system 100 of FIG. 1. As such, like reference is illustrated with like reference numbers 400 higher in FIG. 5 than in FIG. 1. Because many features are the same as FIG. 1, only differences will be discussed.

Notably, in FIG. 5, the first controller 510 includes five inputs, including a first input 512A, a second input 512B, a third input 512C, a fourth controller input 512D, and a fifth input 512E. Here, an input 512C is used to serve as the input to the virtualized turn generator. Moreover, input 512E is designated a "special" button. Thus, the first input 512A corresponds to "one", 512B corresponds to "two" and 512D corresponds to "three" for moving the light element of the first string of illuminable indicia 504. Thus, the first player can actuate the virtualized turn generator and move their virtual game piece (e.g., lighted LED) from the same controller 510. However, in the embodiment of FIG. 1, the virtualized turn generator can generate a pseudo-random number between 1-4, whereas in the embodiment of FIG. 5, the virtualized turn generator (e.g., which can be built into the control board processor, e.g., via FIG. 4), can generate a pseudo-random number between 1-3.

Analogously, the second controller 520 includes five inputs, including a first input 522A, a second input 522B, a third input 522C, a fourth input 522D, and a fifth input 522E. Here, an input 522C is used to serve as the input to the virtualized turn generator. Moreover, input 512E is designated a "special" button. Thus, the first input 522A corresponds to "one", 522B corresponds to "two" and 522D corresponds to "three" for moving the light element of the second string of illuminable indicia 506. Thus, the second player can also actuate the virtualized turn generator and move their virtual game piece (e.g., lighted LED) from the same controller 520. However, in the embodiment of FIG. 1, the virtualized turn generator can generate a pseudo-random number between 1-4, whereas in the embodiment of FIG. 5, the virtualized turn generator (e.g., which can be built into the control board processor, e.g., via FIG. 4), can generate a pseudo-random number between 1-3.

In this embodiment, the output display 534 is illustrated as being integrated into the game board 502. Also, in an example embodiment, the control architecture may be analogous to the control architecture 400 (FIG. 4). As such, the processor and some circuitry is under the game board 502. In this regard, the processor can enforce some game rules if so programmed. For instance, if a player presses the virtualized turn generator input button (e.g., input control 512C on the first controller 510), and the virtualized turn generator displays the value "3" on the output display 534, then player 1 should advance the illuminated light element three spaces forward along the string of illuminable indicia 504. If the player presses either the first control input 512A or the second control input 512B, the processor may be programmed to ignore the actuation and not advance the light element, as those buttons correspond to the wrong value. However, if the player presses the controller input 512D, corresponding to value 3, then the light element can advance three spaces forward. Similarly, the control inputs 522A-522E can be ignored while player 1 is having a turn (i.e., the processor is waiting an input from the first controller 510). The rules work analogously when player 2 is taking a turn. However, strict rule adherence can be programmed into or not into a particular instance of a game, as desired.

In alternative embodiments, control could be implemented as the control architecture 300 (FIG. 3) or control architecture 200 (FIG. 2), but way of illustrative examples.

In this example embodiment, the first controller and the second controller each have a control element (e.g., the center button 512C, 522C for example) that causes actuation of the input of the virtualized turn generator. This button can include dice graphics or other visual cues to instruct the player to press this button to generate a virtual turn.

Also, as illustrated, the first controller 512 and the second controller 522 can operate wired or wirelessly. For example, by integrating a wireless connection, the controllers can be spaced a distance from the game board 502 (e.g., 10-15 feet or approximately 3-4.6 meters) from the game board. This allows disabled persons to situate the controller in a wheel chair, table, or other suitable support structure.

In some embodiments, the game board 502 comprises a board having LED lights mounted therein (or thereunder), along with necessary circuitry. The top surface of the game board 502, including the graphics, theme, landing spaces, etc., can be implemented as unique templates or layover cards that can be placed on, and removed from the game board 502. This allows the same rules/concepts/lights to be used with different themes (e.g., space theme, ocean theme, biome theme, weather theme, sports theme, etc.).

Example Wireless Controller Arrangement

With reference to FIG. 1-FIG. 5, in an example implementation, the first controller 110, 510 and the second controller 120, 520 may be wirelessly communicably coupled to the board processor. For instance, a Wi-Fi server and client configuration can be established, e.g., using a set of three ESP8266 chips by Espressif Systems. An ESP8266 chip is associated with the board processor and functions as a server. An ESP8266 chip is associated with electronics in the first controller 110, 510 and functions as a client. Analogously, an ESP8266 chip is associated with the second controller 120, 520 and also functions as a client.

By way of illustrative example, the server ESP8266 can create an access point address & web server. In addition, a service set identifier (SSID) and/or password can be required to prevent any interruption. Moreover, the two clients ESP8266 chips each create or are otherwise assigned a unique address that tells the server their identity. In this manner, the server can distinguish the first control interface and the second control interface (and hence, distinguish player 1 from player 2 (or more).

Figure 6:
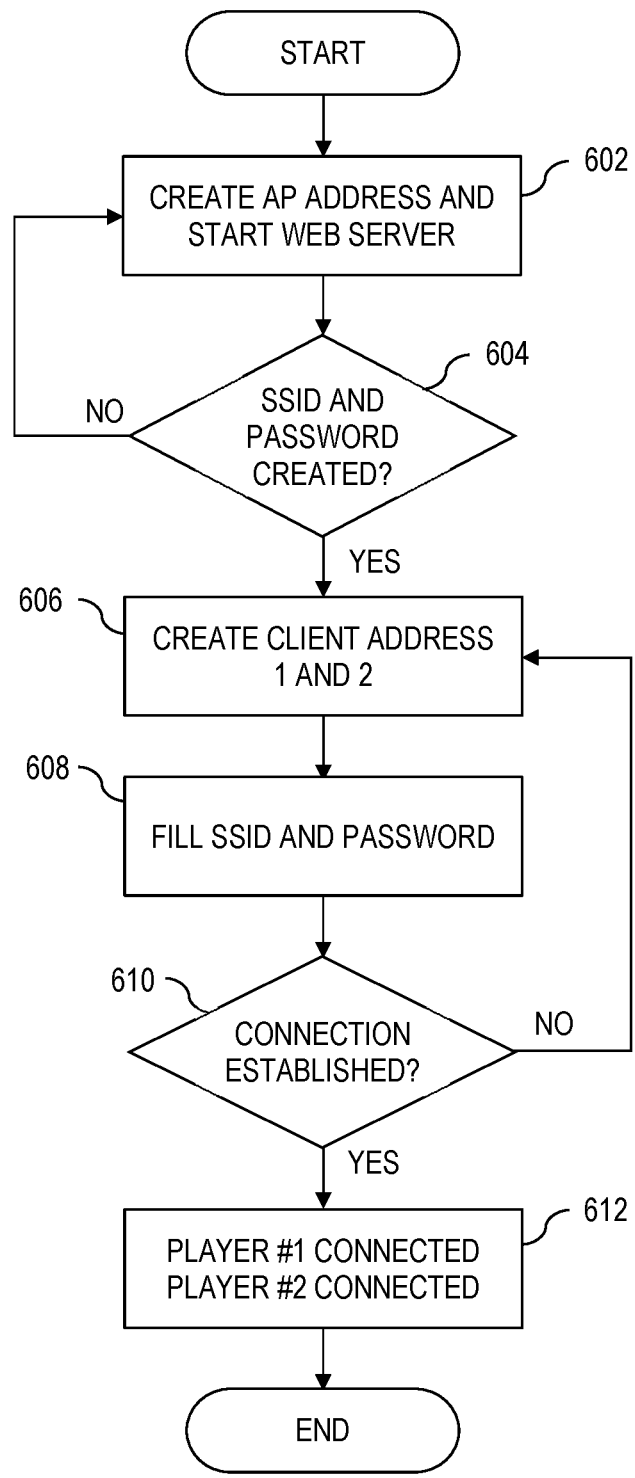
FIG. 6 is a flow chart illustrating an example way of wirelessly connecting controllers to the game board.

Referring to FIG. 6, an example flow chart illustrates a method of creating a local Wi-Fi connection between a board processor and controllers. At 602, the process creates an access point (AP) address and starts a web server. At 604, a check is made whether an SSID and password have been created. If no SSID and password have been created (NO), the process loops back to 602. If an SSID and password have been created (YES), the process creates at 606, client addresses for each remote controller. For instance, in a two-player game, the process creates at 606, a client address 1 and a client address 2.

The process fills at 608, the SSID and password.

In this example, a game may be initiated by successfully connecting or otherwise pairing remote controls, e.g., by connecting a first controller 110 (FIG. 1) to the first controller interface 402, and by connecting a second controller 120 (FIG. 1) to the second control interface 404, via the process 600.

The process determines at 610 whether a connection is established with the remote controllers. If no connection is established (NO), the process loops back to 606. Otherwise, if a connection is established (YES), then player 1 is connected via remote controller 1 and player 2 is connected via remote controller 2 at 612, and the process ends.

The ability to integrate Wi-Fi may also allow reprogramming, updating, adding, modifying, etc., the various games, e.g., by loading new control algorithms. In yet further alternative embodiments, a Universal Serial Bus (USB) interface can be added to load, change, augment, modify, etc., the code stored in the memory so that the processor(s) can carry out new/different functions.

Example Controller Flow

Figure 7:
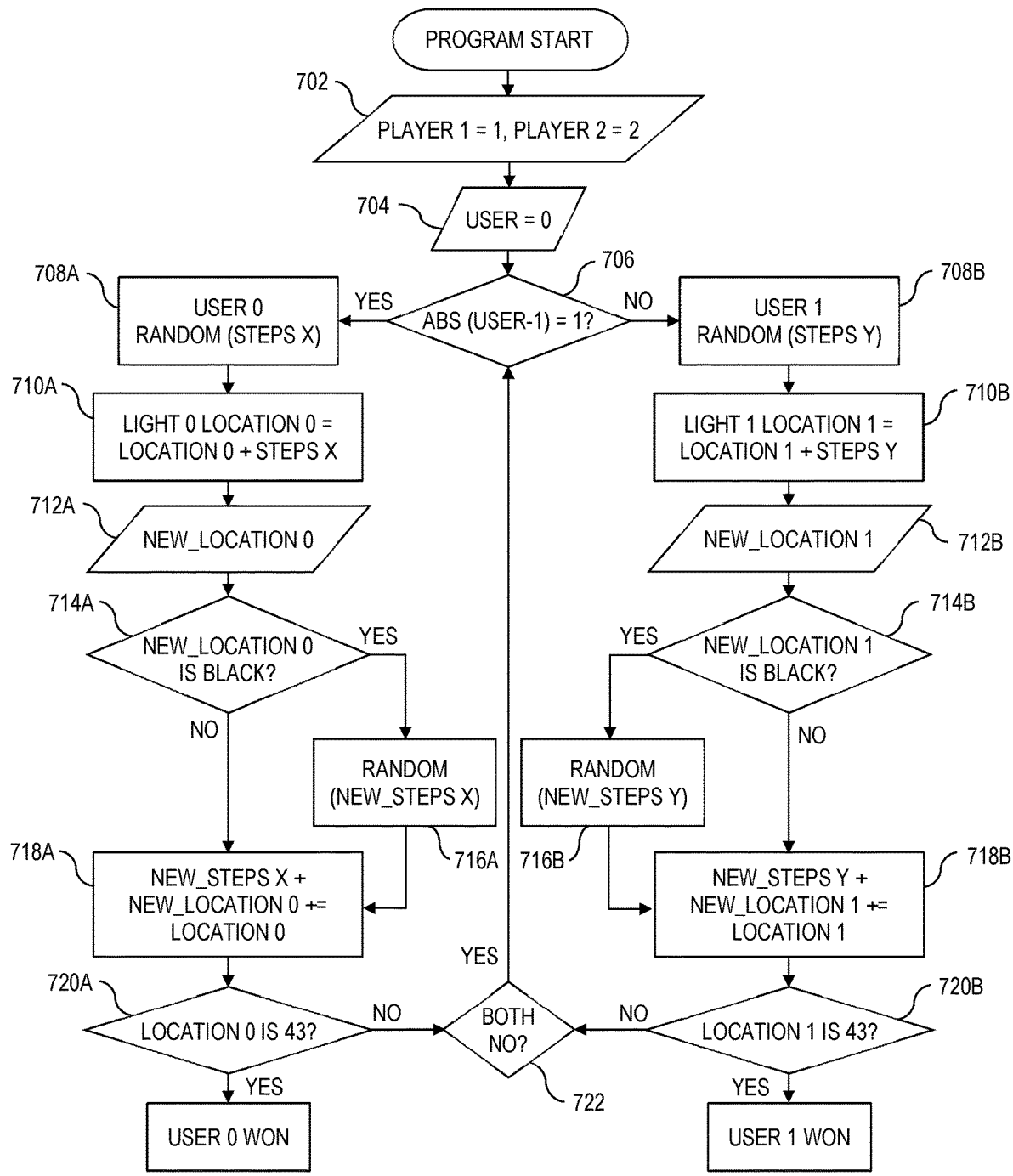
FIG. 7 is a flow chart illustrating an example way of controlling the game board.

Referring to FIG. 7, an example controller flow is provided. At 702, values for player 0 (corresponding to the first player interacting with the first remote control) and player 1 (corresponding to the second player interacting with the second remote control) are defaulted to initial values. At this time, the first string of illuminable indicia have only the first element illuminated at the start landing space 108S and the second string of illuminable indicia also has the first element illuminated at the start landing space 108S.

Control parameters are initialized at 704. By way of example, a variable "USER" is utilized to control which player has the active turn.

At 706, a decision is made as to which player is to go first. In the illustrated example, the variable "USER" is set to 0. Thus, the selection logic at 706 evaluates to YES. For instance, as illustrated, abs(USER-1)=1? Evaluates to true, thus player 1 goes first. By setting USER=1 at 704, then player 2 would go first.

Assuming player 1 goes first, player 1 generates a random number at 708A, e.g., by pressing a "dice" button 512C on the first controller 510 (FIG. 5), by pressing the input 132 (FIG. 1), etc. Responsive to pressing the "dice button", the virtualized turn generator generates a random number, e.g., between 1 and 3 for sake of simplified example, and that number is displayed on an output device, e.g., output 134 (FIG. 1); output 534 (FIG. 5), etc. The player then presses the corresponding control input, e.g., button, switch, etc., on the first controller 510 corresponding to the value generated. If the value generated is three for example, a user may press the button designated "3", e.g., controller input 512D. In some embodiments, the user may have to push one button three times, push the button corresponding to the value 3, or other designated sequence.

Regardless, the illuminated element advances according to the value generated at 710A. For instance, in an example embodiment, the illumination element at the start landing space 108S turns off, and the light string illuminates the next element in the string, in turn, corresponding to the value generated. In the above example, player 1 advances three spaces, which moves the illuminated light element three lights up in the string.

The location of the illuminated element is updated in the memory of the controller at 712A.

In an example embodiment, a special function is implemented. As such, a decision is made at 714A whether the special function is triggered.

For instance, an example game may have a space theme and designate some of the landing spaces as planets, moons, space stations, etc. A black hole may be a special landing space that causes a player to "jump" through space. Here, if the light element illuminates a landing space designating a black hole, at 714C, the player presses a "special" button on the remote control, e.g., button 512E (FIG. 5) at 716A. Here, the board controller randomly generates a number corresponding to a position along the string of illuminable indicia and relocates the illuminated element in the light string to that randomly generated landing space 108. In some embodiments, the jump may be only backwards. In some embodiments, the jump may be only forward. In yet another embodiment the jump may be defined in other ways, e.g., forward or backward, forward or backward but up to X spaces where X is a whole number integer (e.g., by up to 5 spaces), etc.

As another example, a landing space 108 could designate a refueling moon where a player must lose a turn. On the player's next turn, the player presses the "special" button on the control to forego the turn and allow the next player to take a turn. Yet another example might be a "booster rocket" space where a player gets an extra turn. Of course, any path, number of rules, etc., can be programmed into the processor.

The location of the illuminated element is updated at 718A to account for a special feature.

At 720, a check is made to determine whether the illuminated element has advanced to the last space, i.e., last light element in the string, designating arrival at the last landing zone 108E. In the working example of this flow chart, there are 43 light elements, corresponding to 43 spaces. Thus, if the illuminated location into the string is 43 (last light illuminated), then player 1 is designated the winner.

At 722, if both light strings have not illuminated the final light element in the corresponding light string, then player one's turn is over, and the next player gets a turn. Here, the next player is player two. Player two follows an identical flow as player 1, thus the flow chart is designated with like reference numerals replacing a "B" for "A". Here, the functionality is identical to that described above, except for the illumination string corresponding to the player two, and will thus not be repeated.

Single String Configuration

Figure 8:
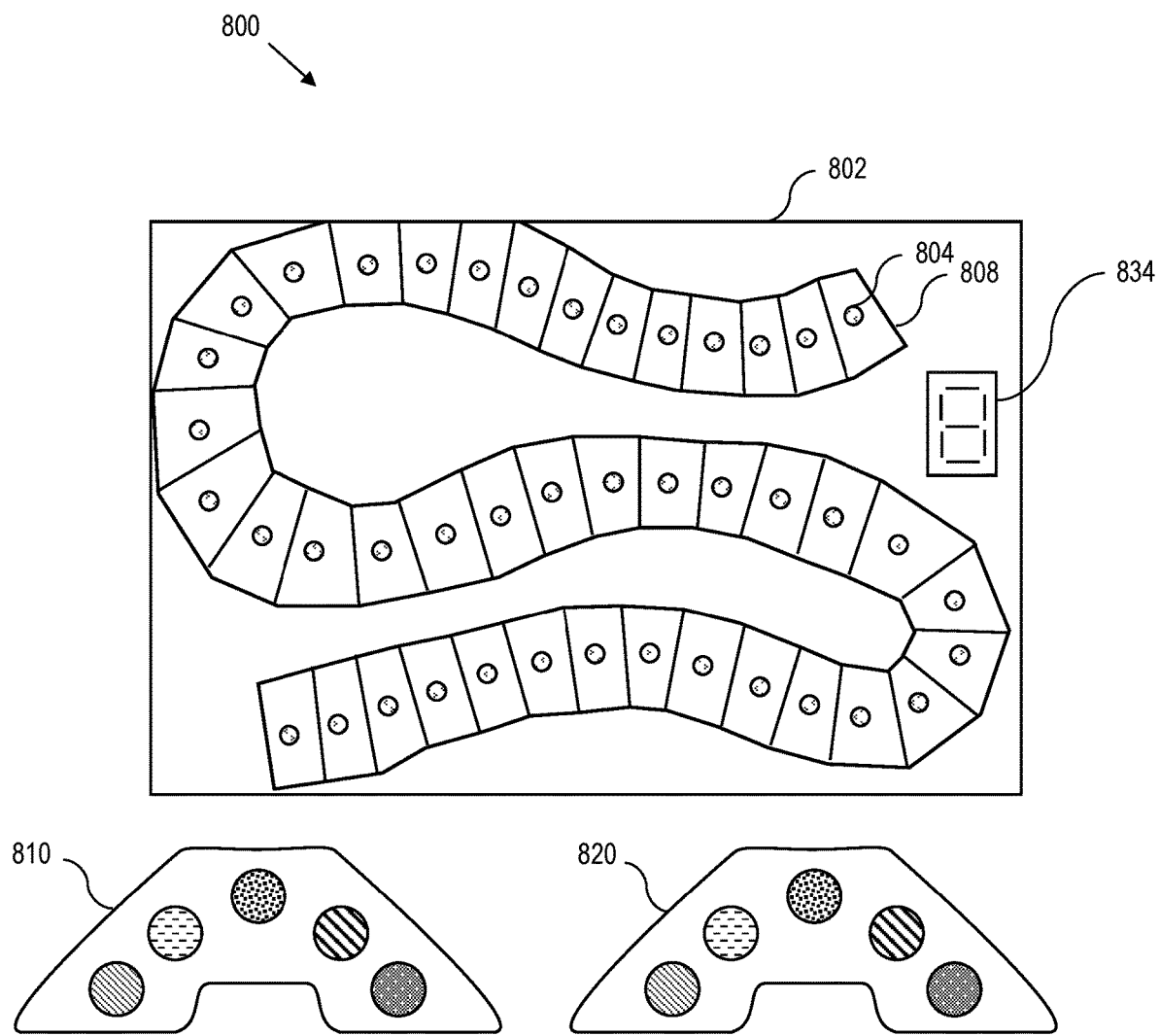
FIG. 8 illustrates yet another example game board that uses a single string of color changing illumination elements.

Referring to FIG. 8, yet another example embodiment of a game system 800 is illustrated. Here, the game board 802 is identical to and can include any of the features set out more fully herein. However, instead of a string of illuminable indicia for each player, there is a single string of illuminable indicia 804 comprised of color changing LEDS so that each player's position is designated by a different color. If each player happens to be on the same landing space 808, then the processor controls the color of the color changing LEDs to show the color of the player whose turn is current. In this regard, details of the first controller 810 and the second controller 820 are omitted from the embodiment of FIG. 8 since any controller and control architecture herein can be utilized with the game board 802, with the only difference being that each player (no matter how many players) each control a single light string. Here, the processor(s) keep track of turn so as to know what color to change to. Otherwise, any of the above-features can be implemented.

Thus, in the illustrated embodiment, a game system 800 is provided. The game system 800 includes a game board 802 having a string of illuminable indicia 804 having individual light elements. The game system also includes a first controller 810 comprising at least one controller input for use by a first player to interact with the game board 802 to participate in a game by controlling a first characteristic of the string of illuminable indicia 804. For instance, the first controller 810 can be programmed to correspond to player 1, and a color of blue. Thus, the first characteristic is the color of the currently illuminated light element when the game calls for player 1 to take a turn. The first controller 810 can include any number of control inputs, examples of which are set out in greater detail herein. For instance, the first controller 810 can include an input to the virtualized turn generator, one or more buttons to move the light element, a "special" function button, etc.

The game system 800 also includes a second controller 820, comprising at least one controller input for use by a second player to interact with the game board 802 to participate in the game by controlling the a second characteristic of the string of illuminable indicia 804. For instance, the second controller 820 can be programmed to correspond to player 2, and a color of red. Thus, the second characteristic is the color of the currently illuminated light element when the game calls for player 2 to take a turn. The second controller 820 can include any number of control inputs, examples of which are set out in greater detail herein. For instance, the second controller 820 can include an input to the virtualized turn generator, one or more buttons to move the light element, a "special" function button, etc.

In the example, the first characteristic comprises a first color and the second characteristic comprises a second color. However, in practice, the first characteristic and the second characteristic can be any other characteristic that can be controlled in the string of illuminable indicia.

The game system 800 also includes a virtualized turn generator having an input and an output display 834. The output display 834 is shown mounted to the game board 802, but the output display 834 can alternatively be not co-located. Actuation of the input causes the virtualized turn generator to generate a value, and display that value on the output display. The value on the output display can be designated by the first controller and the second controller. For instance, as explained more fully herein, the virtualized turn generator can generate a pseudo-random number between 1 and 3, and there are three corresponding buttons on each of the first controller 810 and the second controller 820. The game system 800 also includes a processor programmed by program code stored in memory to interact with the first controller 810 to selectively control the first characteristic of the individual light elements of the string of illuminable indicia 804 and interact with the second controller 820 to selectively control the second characteristic of the individual light elements of the string of illuminable indicia.

As with other examples herein, the processor can form a local Wi-Fi network with the first controller 810 and the second controller 820, e.g., as set out with reference to FIG. 6, such that the first controller 810 and the second controller 820 each communicate wirelessly with the processor of the game board.

Also, the processor can be programmed to only accept as an input, actuation of the control element on the first controller 810 that corresponds to the value generated by the virtualized turn generator when the processor has toggled control to the first controller 810. Here, the processor is further programmed to only accept as an input, actuation of the control element on the second controller 820 that corresponds to the value generated by the virtualized turn generator when the processor has toggled control to the second controller 820. Alternatively, any other rules, restrictions, or permissions can be implemented, including the process of FIG. 7, or any of the other features set out with regard to FIG. 1-FIG. 6.

Working Example 1

Persons with limited mobility have a hard time finding games that are inclusive to them and easy for them to play. As such, a game disclosed herein, is a multi-player game, which can be utilized by persons with limited mobility, limited dexterity, etc., as there are no game pieces that must be picked up and manually moved along a game board.

The game uses LED-lights as player controlled "pieces", which allows anyone to play the game no matter their age or skill level. This also allows for easy assembly and clean-up of the game board.

With reference to the FIGURES generally, in a space themed version of the game, players move their pieces (virtually by the processor controlling the illuminable indicia) along a path of landing spaces 108, which have a space exploration theme. The path on the game board 102 in this example, includes stops along, the way to explore different space achievements including a satellite landing space, a space shuttle landing space, a Mars Rover landing space, an International Space Station landing space, etc. Players use the five buttons on the controllers to advance corresponding spaces on the board be the first to reach the international Space Station by landing on the last space at the end of the path, e.g., landing space 108E (FIG. 1).

In the illustrated two-player version of the game, two "astronaut" players use the board, one player is blue and the other is red. In this example, all of the light elements in the first string of illuminable indicia 104 comprise blue LEDs (or are otherwise controlled to emit blue light when activated) and all of the light elements in the second string of illuminable indicia 106 comprise red LEDs (or are otherwise controlled to emit red light when activated). The light elements on the game board 102 thus match the player's color.

Players advance action by pressing the input 132 of the virtualized turn generator 130. Thus, the input 132 functions as a "dice" control button, causing a number between 1 and 4 to appear on the output display 134. Although disclosed as a separate unit, the input 132 and/or the output display 134 can be coupled to the game board 102, or the input 132 and/or the output display 134 can be separate from the game board 102. For instance, as clarified in FIG. 5, the input 132 can be integrated into each of the first controller 510 as input 512C, and the second controller 520 as input 522C. Here, the input 132 and/or output display 134 may communicate with the virtualized turn generator via wired or wireless connection (e.g., Bluetooth, WiFi, Ultra-wide band, etc.).

In a working example, the virtualized turn generator can generate either a pseudo-random number between 1 and 4, or the virtualized turn generator can randomly select a color (e.g., one of four colors, where each color designates a number of spaces to move). By way of example, red for 1, yellow for 2, green for 3 and blue for 4. Here, the first controller input 112A is colored red, the second controller input 112B is colored yellow, the third controller input 112C is colored green and the fourth controller input 512D is colored blue, with similar colored buttons on the second controller 120. Thus, colors can be used instead of numbers. For instance, as illustrated, the first controller input 112A can be red, the second controller input 112B can be yellow, the third controller input 112C can be green and the fourth controller input 112D can be blue. The player then presses the correct corresponding colored button on the player's controller to advance the player's illuminated position on the pathway on the game board 102.

As another example, the virtualized turn generator can generate a pseudo-random number between 1 and 4. Here, the first controller input 112A is labeled "1", the second controller input 112B is labeled "2", the third controller input 112C is labeled "3" and the fourth controller input 512D is labeled "4", with similar labels for the buttons on the second controller 120. The player then presses the correct corresponding numbered button on the player's controller to advance the player's illuminated position on the pathway on the game board 102.

If a player lands on a designated landing space (e.g., a space designated as a black hole in the space theme) the player presses the fifth controller input 112E, which causes a "jump" to a random place along the path, which may be forward, backward, or either forward or backward of the current position.

The game continues until a player reaches the landing space 108 designated the International Space Station at the end of the path on the game board 102, e.g., landing space 108E.

Miscellaneous

Because the game "pieces" are lights controlled by the player, the "pieces cannot fall off the board or be disturbed unintentionally while the a game is being played.

Some embodiments include wireless, battery-operated controllers can be recharged, e.g., via a standard Universal Serial Bus (USB connector), or by other means. Each controller is configured to control an LED/light strip on a game board. In some embodiments, each controller is utilized to control a unique LED/light strip. In other embodiments, at least one string of color-changing LEDS is utilized. Here, each controller controls a select characteristic (e.g., color) of the color changing LEDs in a corresponding LED/light strip. The light strip is in a path such that the goal is to reach the end of the path before the other player(s).

In this regard, while discussed for sake of convenience as having two players, any number of players can be added, e.g., by adding corresponding controllers and a corresponding string of illuminable indicia to the game board.

As described more fully herein, the controllers each electronically move a "game piece" a certain number of landing spaces forward (or backward) along the path. Here, a "game piece" is actually not a game piece. Rather, a game piece is designated by the processor(s) turning on a select one light element in the corresponding string of illuminable indicia. In this regard, assume a virtual dice roll of 3 is generated, and the player correctly presses button 3 on their controller. The associated string of illuminable indicia can turn off an existing light element and "jump" three adjacent light elements, or the processor can simulate "moving" the game piece, by indexing the illumination such that an light element will be turned off, and the next adjacent light element will be turned on for a short period. The step index process will repeat based upon the random number generated.

The output display of the virtualized turn generator is illustrated as a seven segment LCD for convenience of illustration. In practice, the output device can be a screen, multi segment display, etc. Here, the desired output (e.g., wheel spin, color selection, dice roll, picture matching, etc.), will dictate the necessary complexity of the output display. Thus, the output display can comprise a seven segment display, seven segment color changing display, display screen, touch screen, etc.

Also, a simplified controller may be desired for those with mobility issues. However, in practice, the controller inputs can range in number, type, combinations thereof, etc. For instance, a controller can include buttons, flick switches, spin wheels, combinations thereof, etc. The inputs can light up (e.g., temporarily illuminate, blink, etc.) upon actuation thereof, e.g., to provide feedback to the player that an input has been actuated. The inputs can also/alternatively provide tactile feedback, audible feedback, combinations thereof, etc. Inputs, e.g., buttons, can include braille, different sizes, etc., to accommodate visually impaired individuals.

The game board may be configurable, e.g., to include overlays for different themes, different paths/patterns, etc. The paths may include loops and other features to make the game more challenging.

Thus, by way of example, a board game is provided, in which game action is initiated by players using buttons, switches or joysticks incorporated into the game. The game includes a game board, and a controller comprising one or more of buttons, switches or joysticks for use by a player to interact with the game board to participate in a game. The game board incorporates a light control interface and a plurality of illuminable lights or icons (e.g., LEDs) to identify the position of the player on the game board, without requiring direct manipulation thereof. The controllers comprise a sequence of buttons which may be selectively pressed by a player to participate in a game, as explained more fully herein.

Arduino System Example

In an example implementation, the controller housing is designed to house five arcade-style buttons. Each button is coupled to the central Arduino system via four wires, which may be placed inside of protective shielding. Power and ground wires to each button supply power for button light illumination, and two further wires couple to each button in order to connect to the electrical switch inside the button. The main controller can comprise an Arduino Uno, connected via an Arduino shield to the controller for acquiring the status of the button switch via the connected wires. Of course, other electronics, including dedicated hardware and/ or other processors, state machines, or processing logic can be utilized.

As a particular example, an Arduino Uno can be housed beneath the game board. The Shields and the Arduino Uno use Arduino based code, to communicate with the player controllers and control the display for the "dice", to thus play out the game.

The board can be formed from Polyvinyl chloride (PVC) or other suitable material, with apertures along a path, to hold strings of LED lights. The strings are also connected to the Arduino Uno which controls illumination of the lights during game play. The surface of the game board (or a suitable overlay) is includes the pathway for the game, following the LEDs of the light string.

Individual inputs to the Arduino from the player switches and lights are made via wires and resistors as appropriate for electrical connection to the Arduino.

Each controller can include a whiteboard strip above the buttons, to allow an instructor to write what the button means, based on a student's skill level. From this the game may be used to teach colors, letters or numbers as an inherent feature of game play.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A game system comprising:
a game board having a first string of illuminable indicia and a second string of illuminable indicia thereon, each of the first string of illuminable indicia and the second string of illuminable indicia having individual light elements;
a first controller comprising at least one controller input for use by a first player to interact with the game board to participate in a game by controlling the first string of illuminable indicia;
a second controller comprising at least one controller input for use by a second player to interact with the game board to participate in the game by controlling the second string of illuminable indicia;
a virtualized turn generator having an input and an output display, wherein actuation of the input causes the virtualized turn generator to generate a value, where the value on the output display can be designated by the first controller and the second controller; and
a processor programmed by program code stored in memory to interact with the first controller to selectively turn on or off the individual light elements of the first string of illuminable indicia and interact with the second controller to selectively turn on or off the individual light elements of the second string of illuminable indicia.

2. The board game according to claim 1, wherein the first controller and the second controller each have a control element that causes actuation of the input of the virtualized turn generator.

3. The board game according to claim 2, wherein the processor is programmed to designate which of the first controller and the second controller can be operated to cause actuation of the input to the virtualized turn generator.

4. The board game according to claim 1, wherein the input to the virtualized turn generator comprises a dedicated hardware input separate from the first controller and the second controller.

5. The board game according to claim 1, wherein the first controller and the second controller communicate wirelessly with the processor of the game board.

6. The board game according to claim 5, wherein a processor on the game board forms a local Wi-Fi network with the first controller and the second controller, such that the first controller and the second controller each communicate wirelessly with the processor of the game board.

7. The board game according to claim 1, wherein the virtualized turn generator, upon actuation, randomly generates an output that can take on any one of at least three values.

8. The board game according to claim 7, wherein each of the three values have a corresponding control element on the first controller and the second controller.

9. The board game according to claim 8, wherein the processor is programmed to toggle control between the first controller and the second controller such that a first player using the first a controller and a second player using the second controller must play in turn.

10. The board game according to claim 8, wherein the processor is further programmed to only accept as an input, actuation of the control element on the first controller that corresponds to the value generated by the virtualized turn generator when the processor has toggled control to the first controller, and the processor is further programmed to only accept as an input, actuation of the control element on the second controller that corresponds to the value generated by the virtualized turn generator when the processor has toggled control to the second controller.

11. The board game according to claim 10, wherein the control element comprises a button, wherein the button lights up temporarily upon actuation thereof.

12. A game system comprising:
a game board having a string of illuminable indicia having individual light elements;
a first controller comprising at least one controller input for use by a first player to interact with the game board to participate in a game by controlling a first characteristic of the string of illuminable indicia;
a second controller comprising at least one controller input for use by a second player to interact with the game board to participate in the game by controlling a second characteristic of the string of illuminable indicia;
a virtualized turn generator having an input and an output display, wherein actuation of the input causes the virtualized turn generator to generate a value, where the value on the output display can be designated by the first controller and the second controller; and
a processor programmed by program code stored in memory to interact with the first controller to selectively control the first characteristic of the individual light elements of the string of illuminable indicia and interact with the second controller to selectively control the second characteristic of the individual light elements of the string of illuminable indicia.

13. The game system of claim 12, wherein the first characteristic comprises a first color and the second characteristic comprises a second color.

14. The game system of claim 12, wherein the processor forms a local Wi-Fi network with the first controller and the second controller, such that the first controller and the second controller each communicate wirelessly with the processor of the game board.

15. The game system of claim 12, wherein the processor is programmed to only accept as an input, actuation of the control element on the first controller that corresponds to the value generated by the virtualized turn generator when the processor has toggled control to the first controller, and the processor is further programmed to only accept as an input, actuation of the control element on the second controller that corresponds to the value generated by the virtualized turn generator when the processor has toggled control to the second controller.

16. The board game according to claim 12, wherein the first controller and the second controller each have a control element that causes actuation of the input of the virtualized turn generator.

17. The board game according to claim 12, wherein the output display is mounted to the game board.

* * * * *